US008891105B2

United States Patent
Su

(10) Patent No.: US 8,891,105 B2
(45) Date of Patent: Nov. 18, 2014

(54) DATA PRINTING METHOD AND SYSTEM USING THE SAME

(71) Applicants: Kinpo Electronics, Inc., New Taipei (TW); Cal-Comp Electronics & Communications Company Limited, New Taipei (TW)

(72) Inventor: Chun-Cheng Su, New Taipei (TW)

(73) Assignees: Kinpo Electronics, Inc., New Taipei (TW); Cal-Comp Electronics & Communications Company Limited, New Taipei (TW)

( * ) Notice: Subject to any disclaimer, the term of this patent is extended or adjusted under 35 U.S.C. 154(b) by 0 days.

(21) Appl. No.: 13/772,362

(22) Filed: Feb. 21, 2013

(65) Prior Publication Data

US 2014/0111825 A1    Apr. 24, 2014

(30) Foreign Application Priority Data

Oct. 24, 2012   (TW) ............................... 101139307 A

(51) Int. Cl.
*G06F 3/12* (2006.01)
*G06K 15/00* (2006.01)
*G06F 13/12* (2006.01)

(52) U.S. Cl.
CPC .............. *G06K 15/408* (2013.01); *G06F 3/121* (2013.01); *G06F 3/1234* (2013.01); *G06F 3/1236* (2013.01); *G06F 3/1284* (2013.01); *G06F 13/12* (2013.01)
USPC .......... 358/1.14; 358/1.1; 358/1.13; 358/1.15

(58) Field of Classification Search
CPC ....................................................... G06F 3/12
USPC ........ 358/1.14, 1.1, 1.13, 1.15; 370/217, 219, 370/389, 397, 412, 218, 351, 237, 392, 216, 370/419, 390, 229, 252, 401, 400, 403, 370/466; 709/227, 229, 228, 230, 238, 250, 709/245
See application file for complete search history.

(56) References Cited

U.S. PATENT DOCUMENTS

| 5,651,114 | A | * | 7/1997 | Davidson, Jr. ................. 709/229 |
| 5,684,934 | A | | 11/1997 | Chen et al. |
| 6,151,140 | A | | 11/2000 | Wilcox et al. |
| 6,741,606 | B1 | * | 5/2004 | Mori .............................. 370/463 |
| 7,907,515 | B2 | * | 3/2011 | Fukasawa ...................... 370/216 |
| 8,189,589 | B2 | * | 5/2012 | Tanaka et al. ................. 370/392 |
| 2002/0089687 | A1 | * | 7/2002 | Ferlitsch et al. .............. 358/1.15 |
| 2004/0122952 | A1 | * | 6/2004 | Kistler et al. ................. 709/227 |
| 2011/0001998 | A1 | * | 1/2011 | Nguyen et al. ............... 358/1.13 |
| 2012/0163309 | A1 | | 6/2012 | Ma et al. |

OTHER PUBLICATIONS

Mustafa Ergen, IEEE 802.11 Tutorial Jun. 2002, University of California Berkeley, Published Document Dated Jun. 2002, all pages.*

* cited by examiner

*Primary Examiner* — Ngon Nguyen
(74) *Attorney, Agent, or Firm* — Jianq Chyun IP Office

(57) ABSTRACT

A data printing method adapted for a control end device and a system using the data printing method are provided. The data printing method includes steps of: receiving an operation command; splitting printing data into a plurality of split files; sequentially transmitting the split files to a printing device through a main transmission interface; determining whether the main transmission interface is disconnected; if the main transmission interface is disconnected, transmitting the split files that are not yet transmitted through one of at least one substitute transmission interface.

20 Claims, 3 Drawing Sheets

DATA PRINTING METHOD AND SYSTEM USING THE SAME

CROSS-REFERENCE TO RELATED APPLICATION

This application claims the priority benefit of Taiwan application serial no. 101139307, filed on Oct. 24, 2012. The entirety of the above-mentioned patent application is hereby incorporated by reference herein and made a part of this specification.

BACKGROUND OF THE INVENTION

1. Field of the Invention

The invention pertains to a data printing method and a data printing system.

2. Description of Related Art

Accompanying developments in science and technology, electronic devices including personal computers, tablet computers, and smart phones may be connected to printing devices in different ways, e.g., through the Internet, a universal serial bus (USB), an IEEE 1394 interface, a Bluetooth interface, or any other wireless connection or cable connection, so as to transmit files to the printing devices and print the files.

Conventionally, when a printing device successfully receives data and starts to print the data or already completely prints the data, the printing device transmits a "data transmission completed" message or a "data printing completed" message to the electronic device and informs the user that the data are successfully received and printed. However, the existing printing device neither supports resumable data transmission nor has any error handling mechanism. That is, if the data transmission to the printing device through any of said transmission interfaces is terminated because of unstable network connection, removal of the cable, or the like, the printing device is unable to resume the printing job before the data transmission is terminated. The user must set up the printing job again. In the event that the printing data are multifarious, the necessity for re-setting up the printing job causes great inconvenience to the user.

SUMMARY OF THE INVENTION

The invention is directed to a data printing method and a data printing system capable of resuming a printing job if transmission of the printing data is terminated.

In an embodiment of the invention, a data printing method adapted for a control end device is provided. The data printing method includes steps of receiving an operation command; splitting printing data into a plurality of split files; sequentially transmitting the split files to a printing device through a main transmission interface; determining whether the main transmission interface is disconnected; if the main transmission interface is disconnected, transmitting the split files that are not yet transmitted through one of at least one substitute transmission interface.

In an embodiment of the invention, a data printing system that includes a control end device and a printing device is provided. If the control end device receives an operation command, the control end device splits printing data into a plurality of split files and sequentially transmits the split files through a main transmission interface. The printing device is connected to the control end device, and the printing device receives the split files through the main transmission interface and prints the received split files. The control end device determines whether the main transmission interface is disconnected. If the main transmission interface is disconnected, the control end device transmits non-transmitted split files of the split files through one of at least one substitute transmission interface.

In view of the above, according to the data printing method and the system using the same as described herein, when the main transmission interface that serves to transmit the printing data is disconnected and is no longer able to transmit the printing data, one of other transmission interfaces between the control end device and the printing device may be selected as the substitute transmission interface, and the non-transmitted split files are transmitted to the printing device through the selected substitute transmission interface, so as to resume printing of the non-printed data.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
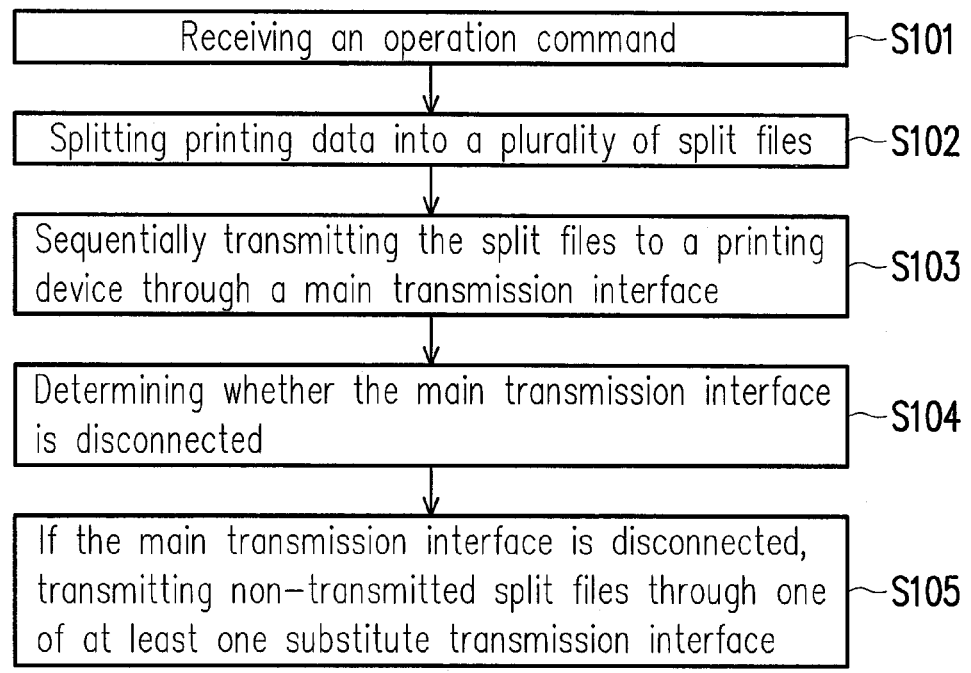
FIG. 1 is a flowchart illustrating a data printing method according to an embodiment of the invention.

FIG. 1 is a flowchart illustrating a data printing method according to an embodiment of the invention. In the invention, the data printing method is adapted for a control end device in a data printing system. With reference to FIG. 1, in step S101, an operation command of printing data is received. In step S102, printing data are split into a plurality of split files. In step S103, the split files are sequentially transmitted to a printing device through a main transmission interface. In step S104, it is determined whether the main transmission interface is disconnected. If the main transmission interface is disconnected, in step S105, the split files that are not successfully transmitted are transmitted through one of at least one substitute transmission interface.

Figure 2:
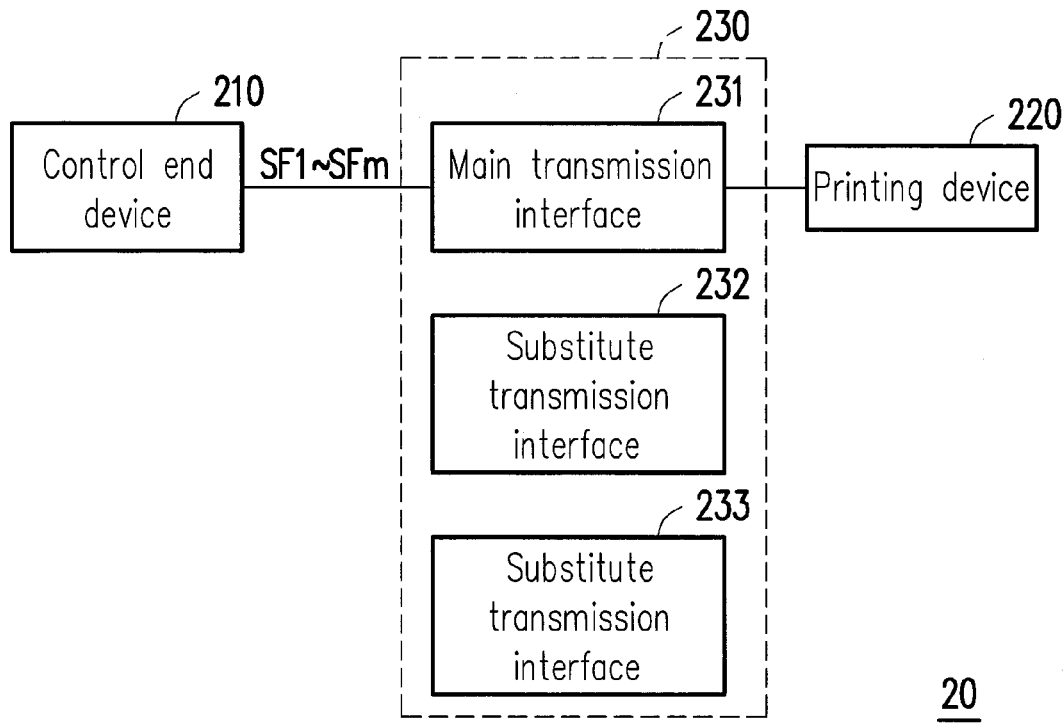
FIG. 2 is a functional block diagram illustrating a data printing system according to an embodiment of the invention.

FIG. 2 is a functional block diagram illustrating a data printing system according to an embodiment of the invention. With reference to FIG. 2, the data printing system 20 includes a control end device 210 and a printing device 220. When the control end device 210 receives an operation command, e.g., when a user intends to print data through operating the control end device 210, the control end device 210 splits printing data into a plurality of split files SF1 to SFm and sequentially transmits the split files SF1 to SFm through a main transmission interface 231 of transmission interfaces 213. The printing device 220 is connected to the control end device 210, and the printing device 220 receives the split files SF1 to SFm through the main transmission interface 231 and prints the received split files SF1 to SFm. Here, the control end device 210 determines whether the main transmission interface 231 is disconnected. If the main transmission interface 231 is disconnected, the control end device 210 transmits non-transmitted split files of the split files SF1 to SFm through one of at least one substitute transmission interface (e.g., the substitute transmission interface 232 or the substitute transmission interface 233).

In an embodiment of the invention, the control end device 210 may be a personal computer (PC), a smart phone, a tablet computer, or any other electronic device that has a data storage function and an input/output function. The printing device 220 may be a laser printer, an inkjet printer, a multi-functional peripheral, and any other electronic device capable of performing a printing job.

There are various transmission interfaces connected to the control end device 210 and the printing device 220, such as an Ethernet network, a wireless local area network (WLAN), a universal serial bus (USB), an IEEE 1394 interface, an external serial advanced technology attachment (eSATA) interface, a Thunderbolt interface, a PS/2 interface, a COM port interface, a Bluetooth interface, or an RJ45 interface. Configurations of these transmission interfaces may alter in case of different types and configurations of the control end device 210 and the printing device 220, which should not be construed as a limitation to the invention.

Here, the control end device 210 and the printing device 220 are connected to each other through one or more transmission interface. For instance, according to the present embodiment, the control end device 210 and the printing device 220 are connected to each other through three transmission interfaces, whereas the number of the transmission interfaces may vary according to actual requirements and should not be limited to that described or depicted herein.

The control end device 210 selects one transmission interface from the transmission interfaces 230 as the main transmission interface 231, while the non-selected transmission interfaces are substitute transmission interfaces (e.g., the substitute transmission interfaces 232 and 233). The main transmission interface 231 is selected from the transmission interfaces 230 in consideration of actual conditions, e.g., difficulty in connecting the transmission interface to the devices, the user's preferences, stability of data transmission, and so on. For instance, according to an embodiment of the invention, in the control end device 210, a user defines and selects the most convenient transmission interface from the transmission interfaces 230 as the main transmission interface 231.

The control end device 210 may determine whether the main transmission interface 231 of the transmission interfaces 230 is disconnected through various mechanisms. According to an embodiment of the invention, as long as the printing device 220 receives the split file (e.g., one of the split files SF1 to SFm), the printing device 220 transmits a confirmation message corresponding to the received split file back to the control end device 210. If the control end device 210 does not receive the confirmation message corresponding to the received split file within a predetermined time frame, the control end device 210 determines that the main transmission interface 231 is disconnected and can no longer transmit data. Said determination mechanism is elaborated hereinafter with reference to the accompanying drawings.

Figure 3:
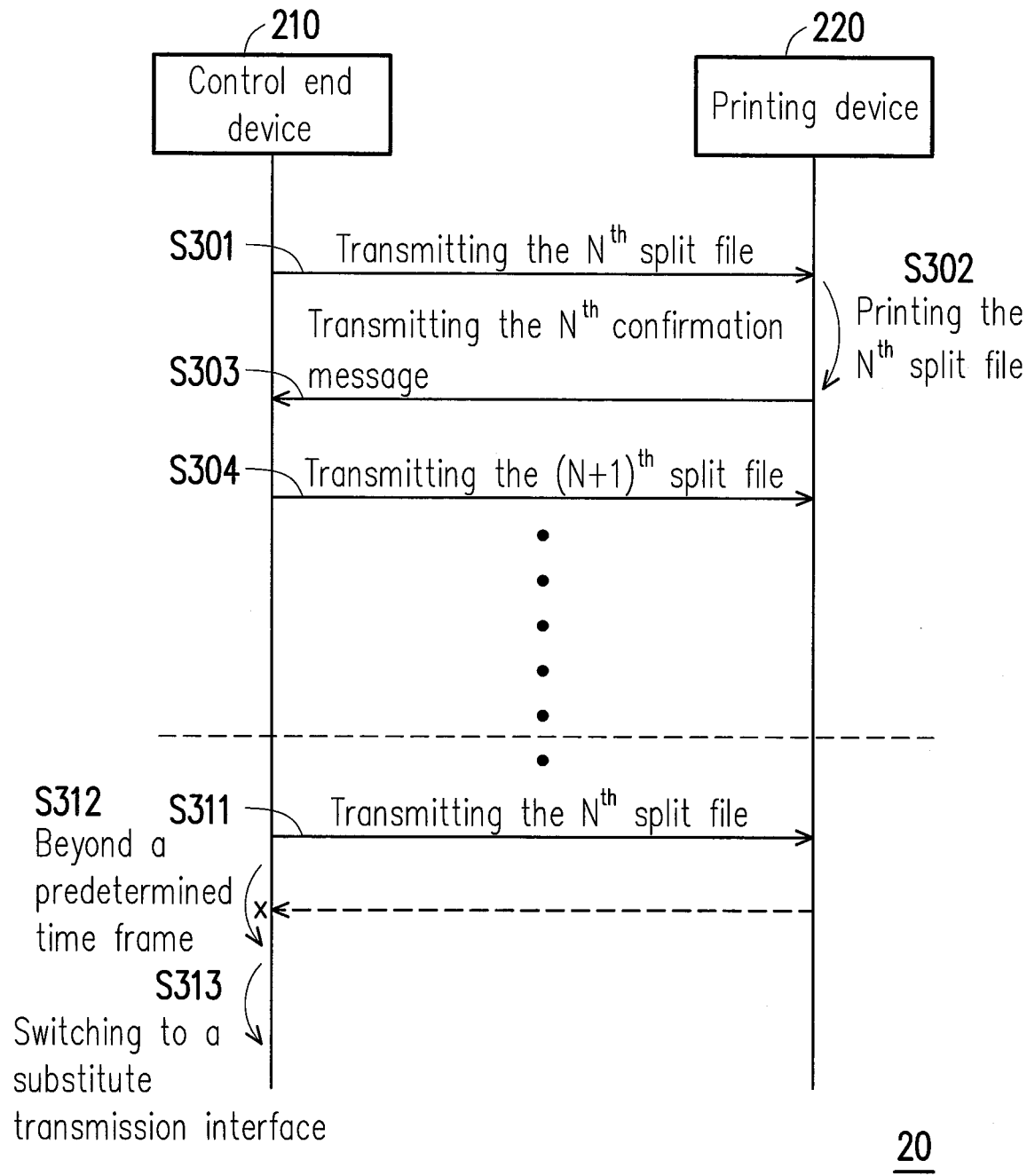
FIG. 3 is a flowchart illustrating a time sequence of transmitting split files by a control end device and a printing device in a data printing system according to an embodiment of the invention.

FIG. 3 is a flowchart illustrating a time sequence of transmitting split files by a control end device and a printing device in a data printing system according to an embodiment of the invention. Here, the printing data are split into m split files, and N is a positive integer ranging from 1 to m. With reference to FIG. 3, in step S301, the control end device 210 transmits the $N^{th}$ split file to the printing device 220. In step S302, the printing device 220 receives and prints the $N^{th}$ split file.

In step S303, the printing device 220 transmits the $N^{th}$ confirmation message corresponding to the $N^{th}$ split file to the control end device 210. It should be mentioned that the printing device 220 performs both the steps of printing the $N^{th}$ split file and transmitting the $N^{th}$ confirmation message to the control end device 210 after receiving the $N^{th}$ split file, while the order of implementing these steps is not limited herein. For instance, the printing device 220 may transmit the $N^{th}$ confirmation message back to the control end device 210 right after receiving the receiving the $N^{th}$ split file, and the printing device 220 then immediately prints the $N^{th}$ split file.

After receiving the $N^{th}$ confirmation message, the control end device 210 transmits the $(N+1)^{th}$ split file in step S304. That is, the control end device 210 transmits the next split file (i.e., the $(N+1)^{th}$ split file) to the printing device 220 only after receiving the confirmation message corresponding to the previous split file (i.e., the $N^{th}$ split file).

In another aspect, when the control end device 210 transmits the $N^{th}$ split file to the printing device 220 in step S311 but fails to receive the corresponding confirmation message within a predetermined time frame in step S312, the control end device 210 switches to one of the substitute transmission interfaces and transmits the $N^{th}$ split file through the substitute transmission interface in step S313. The user may select one of the substitute transmission interfaces according to the actual number and actual types of the transmission interfaces. The way to select the substitute transmission interface may be referred to as the way to select the main transmission interface 231 described above, e.g., a substitute transmission interface with the highest transmission speed may be selected from the substitute transmission interfaces. However, the invention is not limited thereto. In addition, the step of determining whether the main transmission interface is disconnected is not limited to that described above.

Figure 4:
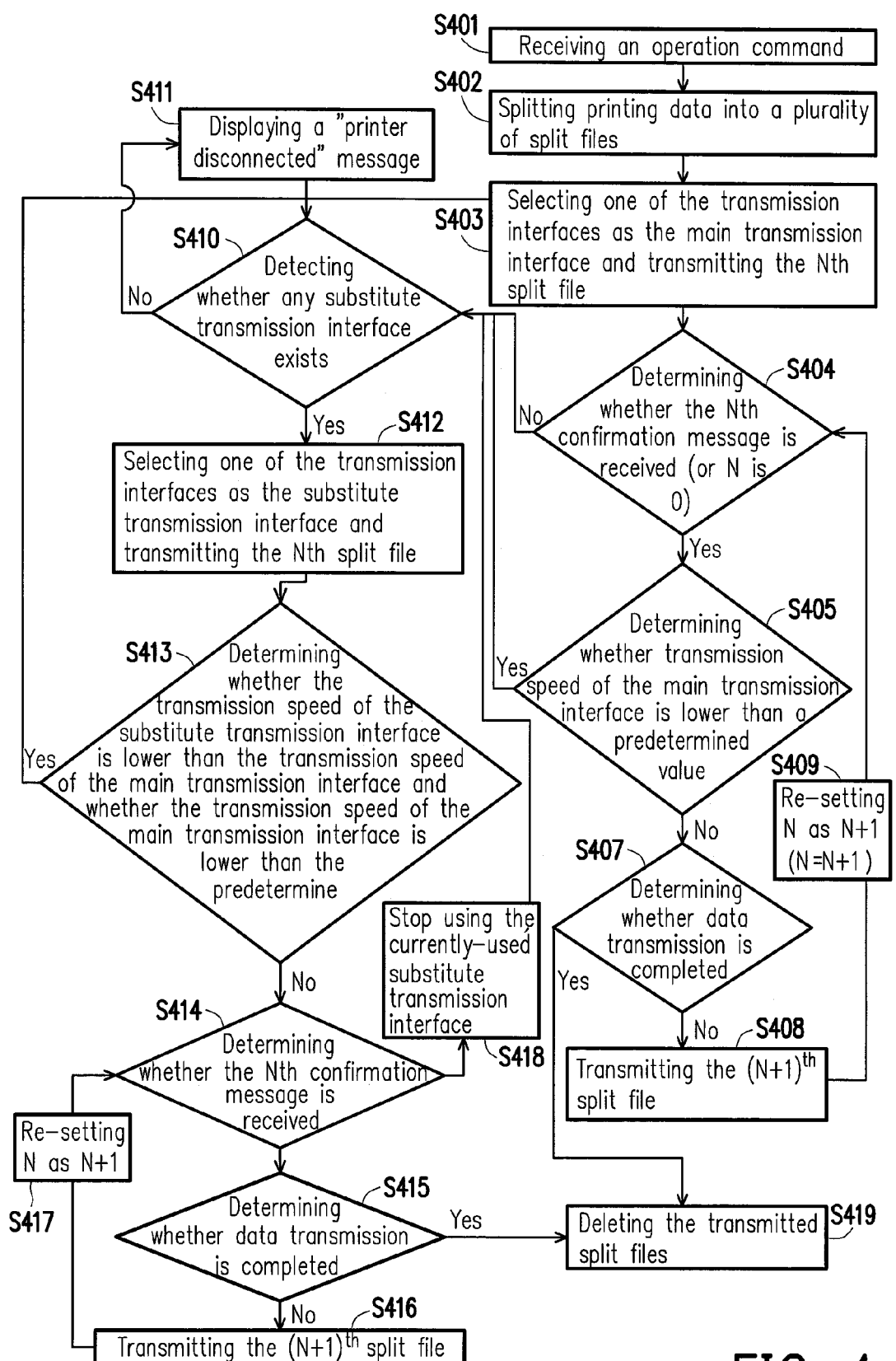
FIG. 4 is a flowchart illustrating a data printing method according to an embodiment of the invention.

FIG. 4 is a flowchart illustrating a data printing method according to an embodiment of the invention. The data printing method described herein is adapted for the control end device 210 shown in FIG. 2 and FIG. 3 and is rather detailed in comparison with the method depicted in FIG. 1.

With reference to FIG. 2 and FIG. 4, in step S401, the control end device 210 receives an operation command of printing data by employing the printing device 200; in step S402, the control end device 210 splits the printing data into a plurality of split files SF1 to SFm. The number of the split files (i.e., the value of m) and the capacity of each split file are determined according to actual requirements. For instance, the printing data are split into pages (in unit of page) or are split in consideration of the capacity of the buffer of the printing device 220, which should not be construed as a limitation to the invention.

The control end device 210 then selects one of the transmission interfaces 230 as the main transmission interface 231 and transmits the split files SF1 to SFm through the main transmission interface 231 in step S403. The control end device 210, before transmitting the $(N+1)^{th}$ split file of the split files SF1 to SFm, determines whether the confirmation message corresponding to the previous split file (i.e., the $N^{th}$ split file) is received from the printing device 220. After receiving the confirmation message corresponding to the $N^{th}$ split file, the control end device 210 transmits the $(N+1)^{th}$ split file to the printing device 220 in step S408 and re-sets N as N+1 in step S409.

In step S407, after all of the split files SF1 to SFm are completely transmitted, the control end device 210 deletes the transmitted split files SF1 to SFm from the device in step S419. If N=0, i.e., if the transmitted split file is the first split file of the split files SF1 to SFm, the control end device 210 need not determine whether the confirmation message corresponding to the previous split file is received or not because no previous split file exists.

Before the control end device 210 transmits the $(N+1)^{th}$ split file, the control end device 210 determines the main transmission interface 231 is disconnected if the control end device 210 does not receive the $N^{th}$ confirmation message corresponding to the $N^{th}$ split file within a predetermined time frame. At this time, the control end device 210 detects whether any substitute transmission interface exists in step S410. If there is an available substitute transmission interface (e.g., the substitute transmission interface 232), the control end device 210 switches to the substitute transmission interface 232 and re-transmits the $N^{th}$ split file to the printing device 220 in step S412.

After receiving the $N^{th}$ confirmation message corresponding to the $N^{th}$ split file in step S414, the control end device 210 continues to transmit the $(N+1)^{th}$ split file to the printing device 220 in step S416 and re-sets N as N+1 in step S417. In step S415, after all of the split files SF1 to SFm are completely transmitted by the control end device 210, the control end device 210 deletes the transmitted split files SF1 to SFm from the device in step S419.

Given that the control end device 210 is unable to receive the $N^{th}$ confirmation message from the substitute transmission interface 232 in step S414, the control end device 210 stops to use the current substitute transmission interface 232 and re-detects whether any other available substitute transmission interface exists in step S410. If all of the transmission interfaces 230 (e.g., the main transmission interface 231 and the substitute transmission interfaces 232 and 233) are disconnected, a display unit (not shown) of the control end device 210 displays a "printer disconnected" message to inform the user that the printing job is not done yet (step S411).

Nonetheless, the split files may not be transmitted through the main transmission interface 231 at the ideal speed due to practical difficulties. According to the present embodiment, in step S405, the control end device 210 further determines whether transmission speed of the main transmission interface is lower than a predetermined value before transmitting the $(N+1)^{th}$ split file. If the control end device 210 determines that the transmission speed of the main transmission interface is lower than the predetermined value, the control end device 210 detects whether any available substitute transmission interface exists in step S410; if yes, the control end device 210 transmits the split files that are not transmitted yet to the printing device 220 through the available substitute transmission interface (e.g., the substitute transmission interface 233).

In this case, if the transmission speed of the selected substitute transmission interface (e.g., the substitute transmission interface 233) is determined to be lower than the transmission speed of the main transmission interface 231 in step S413, the control end device 210 again switches to the main transmission interface 231 to transmit the split files that are not transmitted yet (step S403). Thereby, the control end device 210 may be flexibly switch to any of the transmission interfaces 230 for transmitting the split files SF1 to SFm, and the time spent on transmission of the split files SF1 to SFm may be further reduced.

To sum up, according to the data printing method and the system using the same as described herein, when the main transmission interface that is between the control end device and the printing device and serves to transmit the printing data is disconnected, such disconnection may be detected, and one of other transmission interfaces between the control end device and the printing device may be selected as the substitute transmission interface for further transmitting the non-transmitted split files. Moreover, when the main transmission interface is not disconnected but the transmission speed is excessively low, the control end device may also switch to the substitute transmission interface with the relatively high transmission speed, so as to further reduce the time spent on data transmission.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A data printing method adapted for a control end device, wherein the control end device is connected to a printing device through a main transmission interface and at least one substitute transmission interface, the data printing method comprising:
   receiving an operation command;
   splitting printing data into a plurality of split files;
   sequentially transmitting the split files to the printing device through the main transmission interface;
   determining whether the main transmission interface is disconnected; and
   if the main transmission interface is disconnected, transmitting non-transmitted split files of the split files through one of the at least one substitute transmission interface to the printing device.

2. The data printing method as recited in claim 1, wherein the printing device transmits a plurality of confirmation messages respectively corresponding to the split files, and the step of sequentially transmitting the split files to the printing device through the main transmission interface comprises:
   if receiving an $N^{th}$ confirmation message of the confirmation messages corresponding to an $N^{th}$ split file of the split files, transmitting an $(N+1)^{th}$ split file of the split files to the printing device, wherein N is a positive integer.

3. The data printing method as recited in claim 2, wherein the step of determining whether the main transmission interface is disconnected comprises:
   after transmitting the $N^{th}$ split file, determining whether the $N^{th}$ confirmation message corresponding to the $N^{th}$ split file is not received within a predetermined time frame.

4. The data printing method as recited in claim 1, wherein the main transmission interface comprises:
   an Ethernet network, a wireless local area network, a universal serial bus, an IEEE 1394 interface, an external serial advanced technology attachment interface, a Thunderbolt interface, a PS/2 interface, a COM port interface, a Bluetooth interface, or an RJ45 interface.

5. The data printing method as recited in claim 1, wherein the at least one substitute transmission interface comprises:
   an Ethernet network, a wireless local area network, a universal serial bus, an IEEE 1394 interface, an external serial advanced technology attachment interface, a Thunderbolt interface, a PS/2 interface, a COM port interface, a Bluetooth interface, or an RJ45 interface.

6. The data printing method as recited in claim 1, before sequentially transmitting the split files to the printing device through the main transmission interface, the method further comprising:

detecting all transmission interfaces between the control end device and the printing device; and selecting one transmission interface with highest transmission speed from the transmission interfaces as the main transmission interface.

7. The data printing method as recited in claim 1, wherein the step of transmitting the non-transmitted split files through the one of at least one substitute transmission interface further comprises:

connecting the printing device through the at least one substitute transmission interface; and detecting transmission speed of the at least one substitute transmission interface and selecting a substitute transmission interface with highest transmission speed from the at least one substitute transmission interface to transmit the non-transmitted split files.

8. The data printing method as recited in claim 1, wherein the step of determining whether the main transmission interface is disconnected further comprises:

determining the main transmission interface is disconnected if transmission speed of the main transmission interface is lower than a predetermined value.

9. The data printing method as recited in claim 8, wherein the step of transmitting the non-transmitted split files through the one of at least one substitute transmission interface comprises:

switching to the main transmission interface and transmitting the non-transmitted split files if the transmission speed of the main transmission interface is lower than the predetermined value but higher than transmission speed of the at least one substitute transmission interface.

10. The data printing method as recited in claim 1, further comprising:

displaying a "printer disconnected" message on a display unit of the control end device if the main transmission interface is disconnected and the at least one transmission interface is also disconnected.

11. A data printing system comprising:

a control end device, if receiving an operation command, the control end device splitting printing data into a plurality of split files and sequentially transmitting the split files through a main transmission interface; and a printing device connected to the control end device through the main transmission interface and at least one substitute transmission interface, the printing device receiving the split files through the main transmission interface and printing the received split files, wherein the control end device determines whether the main transmission interface is disconnected, and if the main transmission interface is disconnected, the control end device transmits non-transmitted split files of the split files through one of the at least one substitute transmission interface to the printing device.

12. The data printing system as recited in claim 11, the printing device transmitting a plurality of confirmation messages back to the control end device, wherein if the printing device receives an $N^{th}$ split file of the split files, the printing device transmits an $N^{th}$ confirmation message of the confirmation messages corresponding to the $N^{th}$ split file back to the control end device, if the control end device receives the Nth confirmation message corresponding to the $N^{th}$ split file, the control end device transmits an $(N+1)^{th}$ split file of the split files to the printing device, and N is a positive integer.

13. The data printing system as recited in claim 12, wherein after the control end device transmits the $N^{th}$ split file, the control end device determines the main transmission interface is disconnected if the control end device does not receive the $N^{th}$ confirmation message corresponding to the $N^{th}$ split file within a predetermined time frame.

14. The data printing system as recited in claim 11, wherein the main transmission interface comprises an Ethernet network, a wireless local area network, a universal serial bus, an IEEE 1394 interface, an external serial advanced technology attachment interface, a Thunderbolt interface, a PS/2 interface, a COM port interface, a Bluetooth interface, or an RJ45 interface.

15. The data printing system as recited in claim 11, wherein the at least one substitute transmission interface comprises an Ethernet network, a wireless local area network, a universal serial bus, an IEEE 1394 interface, an external serial advanced technology attachment interface, a Thunderbolt interface, a PS/2 interface, a COM port interface, a Bluetooth interface, or an RJ45 interface.

16. The data printing system as recited in claim 11, wherein the control end device detects all transmission interfaces between the control end device and the printing device, and the control end device selects one transmission interface with highest transmission speed from the transmission interfaces as the main transmission interface.

17. The data printing system as recited in claim 11, wherein when the control end device is connected to the printing device through the at least one substitute transmission interface, the control end device detects transmission speed of the at least one substitute transmission interface and selects a substitute transmission interface with highest transmission speed from the at least one substitute transmission interface to transmit the non-transmitted split files.

18. The data printing system as recited in claim 11, wherein the control end device determines the main transmission interface is disconnected if transmission speed of the main transmission interface is lower than a predetermined value.

19. The data printing system as recited in claim 18, wherein the control end device switches to the main transmission interface and transmits the non-transmitted split files if the transmission speed of the main transmission interface is lower than the predetermined value but higher than transmission speed of the at least one substitute transmission interface.

20. The data printing system as recited in claim 11, wherein the control end device further comprises a display unit, and the display units displays a "printer disconnected" message if the main transmission interface is disconnected and the at least one transmission interface is also disconnected.

* * * * *